(12) United States Patent
Kiyotani et al.

(10) Patent No.: US 10,486,906 B2
(45) Date of Patent: Nov. 26, 2019

(54) TRANSLATION MOVEMENT DEVICE EMPLOYING BELT DRIVE

(71) Applicant: MITUTOYO CORPORATION, Kanagawa (JP)

(72) Inventors: Shingo Kiyotani, Tochigi (JP); Seiichi Otsubo, Tochigi (JP); Koji Takesako, Tochigi (JP); Takao Oneta, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 29 days.

(21) Appl. No.: 15/958,457

(22) Filed: Apr. 20, 2018

(65) Prior Publication Data

US 2018/0305130 A1 Oct. 25, 2018

(30) Foreign Application Priority Data

Apr. 24, 2017 (JP) ................. 2017-085244

(51) Int. Cl.
| | |
|---|---|
| B65G 15/62 | (2006.01) |
| B65G 15/64 | (2006.01) |
| B65G 15/30 | (2006.01) |
| B65G 21/20 | (2006.01) |
| B65G 23/44 | (2006.01) |
| G01B 5/008 | (2006.01) |
| F16H 19/06 | (2006.01) |
| G01B 5/00 | (2006.01) |

(52) U.S. Cl.
CPC ............ *B65G 15/62* (2013.01); *B65G 15/30* (2013.01); *B65G 15/64* (2013.01); *B65G 21/209* (2013.01); *B65G 23/44* (2013.01); *F16H 19/0622* (2013.01); *F16H 19/0672* (2013.01); *G01B 5/008* (2013.01); *G01B 5/0009* (2013.01); *G01B 5/0014* (2013.01); *B65G 2812/02148* (2013.01); *B65G 2812/02168* (2013.01)

(58) Field of Classification Search
CPC ......... B65G 15/30; B65G 15/62; B65G 15/64
USPC ............... 198/750.1, 750.11, 837, 844.2
See application file for complete search history.

(56) References Cited

U.S. PATENT DOCUMENTS

| | | | | |
|---|---|---|---|---|
| 5,690,567 A | * | 11/1997 | Denijs ..................... | F16H 19/06 198/750.1 |
| 5,979,639 A | * | 11/1999 | Sytema .................. | B65G 17/42 198/731 |
| 6,520,320 B1 | * | 2/2003 | Wang ...................... | B23Q 1/58 198/750.1 |
| 6,553,855 B2 | * | 4/2003 | Takahashi ............... | B23Q 1/56 384/13 |
| 6,766,897 B2 | * | 7/2004 | Kuwabara ............. | F16C 29/065 198/468.9 |

(Continued)

FOREIGN PATENT DOCUMENTS

JP 2016-090052 A 5/2016

*Primary Examiner* — Douglas A Hess
(74) *Attorney, Agent, or Firm* — Greenblum & Bernstein, P.L.C.

(57) ABSTRACT

A translation movement device includes a guide, a long slider guided by the guide, and a belt driver displacing the slider; and the belt driver includes an open belt arranged parallel to the slider, a drive pulley for the open belt, and a tension bar arranged parallel to the open belt; and the tension bar is connected to the long slider at a middle position between two belt holders that hold respective end portions of the open belt.

17 Claims, 14 Drawing Sheets

(56) References Cited

U.S. PATENT DOCUMENTS

| | | | | |
|---|---|---|---|---|
| 8,297,139 B2* | 10/2012 | McArdle | ............... | B23P 19/007 |
| | | | | 414/589 |
| 8,720,675 B2* | 5/2014 | Gentz | .................... | B65G 15/34 |
| | | | | 198/844.1 |
| 9,452,890 B2* | 9/2016 | Spaulding | .............. | B65G 27/32 |
| 9,999,168 B2* | 6/2018 | Otsubo | ............. | H05K 13/0061 |
| 2017/0248208 A1 | 8/2017 | Tamura | | |

* cited by examiner

RELATED ART

RELATED ART

TRANSLATION MOVEMENT DEVICE EMPLOYING BELT DRIVE

CROSS-REFERENCE TO RELATED APPLICATIONS

The present application claims priority under 35 U.S.C. § 119 of Japanese Application No. 2017-085244, filed on Apr. 24, 2017, the disclosure of which is expressly incorporated by reference herein in its entirety.

BACKGROUND OF THE INVENTION

1. Field of the Invention

The present invention relates to a translation movement device employing a belt drive.

2. Description of Related Art

Known examples of a conventional translation movement device which uses a timing belt include a closed-belt type and an open-belt type. Both types are a reciprocating displacement apparatus, provided with a linear guide, a slider guided along the guide, and a drive mechanism displacing the slider, and both types include a belt drive mechanism using a timing belt as a transmitter.

The former closed-belt type translation movement device is widely used for various measuring devices, however, since the closed-belt is used as the transmitter, two pulleys are arranged separately from each other on a driving side and a driven side and thereby complicate the apparatus structure.

On the other hand, the latter open-belt type translation movement device has the timing belt arranged along the linear guide and both end portions of the belt (open ends) are fixated to each end of the guide, as shown in Japanese Patent Laid-open Publication No. 2016-90052 (FIG. 14). Further, the slider linearly moving along the guide includes a driving pulley engaging with a tooth surface of the timing belt. The driving pulley is arranged between the timing belt and the guide, and therefore the tooth surface of the timing belt and an outer circumferential surface of the driving pulley are engaged with each other. Furthermore, so as to increase a winding angle of the timing belt with regard to the driving pulley, the slider is provided with a pair of auxiliary pulleys and defines the movement direction of the timing belt. Both translation movement devices can also select whether the slider advances or retreats by switching a rotation direction of the driving pulley.

Inventors have been developing the open-belt type translation movement device in Japanese Patent Laid-open Publication No. 2016-90052 (FIG. 14) to apply to the translation movement devices of a coordinate measuring device, image measuring device, and form measuring device.

FIG. 11 schematically illustrates a configuration where the open-belt type translation movement device is applied as a Z-axis displacement apparatus displacing a measurement head having a stylus head in a vertical direction. In the present specification, a long slider guided in the vertical direction in the Z-axis displacement apparatus is particularly referred to as a "spindle" and the measurement head is provided to a bottom end of a spindle 2 in FIG. 11.

In the example of FIG. 11, a Y-axis displacement apparatus of the measuring device is configured by a Y guide 3A provided to a Y beam 3 (guide rail and linear bearing assembly) and a Y slider 4 guided and supported in the Y-axis direction by the Y guide 3A. A Z-axis displacement apparatus 1 is installed on the Y slider 4. The Z-axis displacement apparatus 1 includes a Z guide 5 provided to the Y slider 4, the spindle 2 guided in the Z-axis direction by the Z guide 5, and a Z driver 6 provided to the Y slider 4 and displacing the spindle 2 in the vertical direction. A dimension of the spindle 2 in the vertical direction is longer than the vertical-direction dimension of a guide mechanism included in the Z guide 5. The belt driver 6 includes an open belt 7 arranged along a displacement direction of the spindle 2, a driving pulley 8 transmitting a driving force to the open belt 7, and an auxiliary pulley 8A increasing a winding angle of the open belt 7 with respect to the driving pulley 8, and both end portions of the open belt 7 are held by the spindle 2 respectively.

In addition, both open end portions of the open belt 7 are respectively held by belt holders 2A and 2B that are provided separately at two positions on the spindle 2 in the Z-axis direction. Further, the open belt 7 is hung over the driving pulley 8 of the belt driver 6. A distance between the belt holders 2A and 2B is at least larger than a displacement distance of the spindle 2.

In the Z-axis displacement apparatus 1 configured this way, when the open belt 7 is sent in the vertical direction by torque of the driving pulley 8, the spindle 2 moves up and down in accordance with the rotation direction.

The open-belt type allows the apparatus to be simplified. Specifics for the open-belt type Z-axis translation movement device can be referenced in a configuration of a Z-axis translation movement device cited in the specification of Japanese Application No. 2016-222755 which has been prior filed by the same applicant.

However, the inventors are not satisfied with only applying the configuration described in FIG. 11 to the translation movement device of the measuring device, so further consideration was made to improve measurement accuracy of the measuring device.

First, in the configuration of FIG. 11, the open belt 7 is fixated to the spindle 2 with tension applied in order to prevent tooth skipping. This is referred to as initial tension.

The two belt holders 2A and 2B on the spindle 2 each receive the initial tension, however, a middle portion of the spindle 2 is restricted from displacement in an X-axis direction by the guide mechanism of the Z guide 5. Accordingly, when the upper belt holder 2A of the spindle 2 sticks out above the guide mechanism of the Z guide 5, a bending moment, such that the upper belt holder 2A is displaced toward a positive X-axis direction, is applied to the spindle 2. Similarly, when the lower belt holder 2B of the spindle 2 sticks out below the guide mechanism of the Z guide 5, the bending moment, such that the lower belt holder 2B is displaced toward the positive X-axis direction, is applied to the spindle 2. When the bending moment is applied, the spindle 2 bends so as to bulge to the left side in FIG. 11. Hereafter, this bending is referred to as bending in the positive X-axis direction.

Though the Z guide 5 of the Z-axis displacement apparatus 1 guides the spindle 2 in the vertical direction, the Z guide 5 does not necessarily support a dead load of the spindle 2. The dead load of the spindle 2 becomes a load on the driving pulley 8 of the belt driver 6 via the open belt 7. Therefore, the driving pulley 8 continues to output torque in the direction to which the belt below the pulley 8 is pulled and increases a force pulling the lower belt holder 2B. Accordingly, the dead load of the spindle 2 is canceled out and the position of the spindle 2 in the Z-axis direction is held. However, the force received by the belt holder 2B is increased and thereby an amount of bending deformation of the spindle 2 is also increased. The force applied to the belt holder 2B in order to hold the dead load of the spindle 2 is expressed by $F_{ZG}$.

Next, with reference to FIGS. 12 and 13, elevation and lowering of the spindle 2 is described. Ignoring friction between the guide rail of the spindle 2 and the Z guide 5, when the spindle 2 is displaced (elevated) in the positive Z-axis direction, as shown in FIG. 12, the torque output from the driving pulley is increased. Then, the force accelerating the spindle 2 in the positive Z-axis direction ($F_{ZACC}$) and the force holding the dead load of the spindle 2 ($F_{ZG}$) is added and the sum of the forces ($F_{ZACC}+F_{ZG}$) is added to the lower belt holder 2B. Accordingly, the spindle 2 is accelerated and obtains elevating speed, however, the bending deformation amount of the spindle 2 is further increased by the force applied to the belt holder 2B increasing.

On the other hand, when the spindle 2 is displaced (lowered) in a negative Z-axis direction, as shown in FIG. 13, the torque output from the driving pulley is decreased. Then, the difference in force ($F_{ZG}-F_{ZACC}$) between the force accelerating the spindle 2 in the negative Z-axis direction ($F_{ZACC}$) and the force holding the dead load of the spindle 2 ($F_{ZG}$) is added to the lower belt holder 2B. Accordingly, the spindle 2 is accelerated and obtains descent speed, however, because the force received by the belt holder 2B is decreased, the bending deformation amount of the spindle 2 decreases by that amount.

With this configuration, depending on the direction of movement of the spindle 2, the force applied to the belt holder 2B at a bottom end of the spindle 2 varies. The belt holder 2B is always positioned lower than the guide mechanism of the Z guide 5, and therefore, depending on the displacement direction of the spindle 2, a size of the bending moment applied to the belt holder 2B of the spindle 2 also varies. As a result, even though the position of the spindle 2 in the vertical direction is the same, when the spindle 2 is elevated and lowered, the bending deformation amount of the spindle 2 is different and the position of the bottom end of the spindle 2 in the X-axis direction may differ.

In order to further improve the measurement accuracy of the measuring device, the differences mentioned above should be eliminated. When the measuring device measures a work piece with the stylus head of the measurement head while elevating the spindle 2 (FIG. 12) and lowering the spindle 2 (FIG. 13), the position of the measurement head is different, and the measurement results deteriorate since a difference is produced in the measurement results for the same point on the work piece. In the above, with reference to FIGS. 11 to 13, a concern about the configuration of the translation movement device which elevates and lowers the spindle is described. However, the same challenge arises in the configuration of a translation movement device which displaces in an inclination direction or horizontal direction as long as these apparatuses have the mechanism configured by the guide and the long slide in common.

In addition, when an environmental temperature where the measuring device is arranged rises, both the spindle and the open belt expand together. Although the spindle is generally made of metal, the open belt is often made of rubber containing glass fiber which is widely used for industrial articles. Since coefficients of thermal expansion of the respective materials are different, the deformation of the open belt is small relative to the deformation of the spindle. As a result, as depicted in FIG. 14, the spindle is bent in the positive X-axis direction due to a difference in the coefficient of thermal expansion when the environmental temperature rises. As a result, the measurement results of the measuring device may be affected.

SUMMARY OF THE INVENTION

Therefore, in a translation movement device employing a belt drive, when a spindle is displaced in one direction or the opposite direction relative to a guide, a difference may arise in a displacement amount of an end portion of the spindle in a direction orthogonal to the displacement direction and the present invention minimizes this difference. Also, in the translation movement device employing the belt drive, the present invention is configured such that the position of an end portion of a long slider does not move in a direction orthogonal to the displacement direction even when an environmental temperature changes, because the above-mentioned difference in the coefficient of thermal expansion between a long slider and an open belt is not produced. Further, by providing a measurement head to a tip of the long slider and using the present invention as the translation movement device of a measuring device, the present invention improves measurement accuracy of the measuring device.

In order to resolve the above-noted issue, a translation movement device according to the present invention includes a guide, a long slider guided by the guide, and a belt driver displacing the long slider with respect to the guide. A shape of the long slider is longer in a displacement direction than a guide mechanism of the guide. The belt driver includes an open belt arranged along the displacement direction of the long slider, a drive pulley transmitting a driving force to the open belt, and a tension bar arranged along the displacement direction of the long slider. The tension bar includes belt holders holding respective end portions of the open belt and the tension bar is connected to the long slider at a middle position between the belt holders holding the respective end portions.

In this configuration, the belt holder is provided not to the long slider, but to the tension bar that is arranged along the displacement direction. The tension bar is connected to the long slider. In this way, the two end portions of the open belt are not held by the long slider directly, and therefore, the driving force transmitted from the open belt is transmitted to the long slider via the tension bar, and the long slider displaces integrally with the tension bar.

In the tension bar, the belt holders are arranged separately in the displacement direction, and the tension bar is connected to the long slider at the middle position of the belt holders. Accordingly, a bending moment caused by initial tension of the open belt is applied to each belt holder of the tension bar, and the tension bar is deformed and an area near the two end portions of the tension bar (position of each belt holder) is displaced in the direction orthogonal to the displacement direction. On the other hand, the guide regulates the displacement of the long slider in the direction orthogonal to the displacement direction, and a connecting portion where the long slider is connected with the tension bar is at a middle portion of the tension bar, and therefore, the long slider does not deform like the tension bar.

Further, the connecting portion between the tension bar and the long slider is preferably concentrated at one position on the tension bar as much as possible. More preferably, only one connecting portion is provided. In addition, when the connecting portion is provided to substantially a center of the tension bar in a length direction, displacement in the deformation direction due to thermal expansion of the tension bar is suppressed, which is preferable.

As described above, even though the tension bar is deformed due to the bending moment, the long slider is hardly deformed at all. Therefore, even when different degrees of tension are applied to the belt holders when the long slider is elevating or lowering, only the deformation amount of the tension bar changes and the long slider is hardly affected by that.

Furthermore, when the environmental temperature where the translation movement device is arranged rises, the long slider, the tension bar, and the open belt all expand. In this example, the open belt is generally made of rubber and the tension bar is generally made of metal. The open belt and the tension bar are connected by the belt holders and so, similar to the conventional type in FIG. 14, when the environmental temperature rises, the tension bar bends due to the difference in the coefficient of thermal expansion between the metal and rubber. However, the tension bar and the long slider are connected at the middle portion of the tension bar, and therefore, even when the tension bar is deformed, the long slider is hardly affected. Although the material of the tension bar and the long slider may be different, the connecting portion between the tension bar and the long slider is in the middle portion of the tension bar, and therefore despite the difference in the amount of thermal expansion, the tension bar and the long slider do not influence each other.

For this reason, when the tension applied to the belt holders is different in accordance with the displacement direction of the long slider, the influence of the difference on the position of the end portion of the long slider is extremely small. Similarly, the difference in the coefficient of thermal expansion due to the change of the environmental temperature also has a very small influence on the position of the end portion of the long slider.

In addition, the displacement direction of the long slider is preferably in an elevating/lowering direction. Further, in cross section on a plane orthogonal to the displacement direction, the tension bar is preferably formed in a shape having enough rigidity to prevent buckling deformation in response to the tension received from the open belt. With this configuration, the tension bar has a U-shaped cross-sectional shape, for example. Therefore, the tension bar has a large second moment of area and as the rigidity in a buckling direction is increased, the tension bar can be lighter in weight when the tension bar has the U-shaped cross-sectional shape than when the tension bar is thicker.

In addition, the connecting portion connecting the tension bar and the long slider is preferably arranged near a center of gravity of the long slider on a plane orthogonal to the displacement direction. With this configuration, the driving force from the driving pulley is transmitted to a point near the center of gravity of the long slider, and an effect can be obtained where vibration while displacing the long slider is suppressed. For example, an indentation capable of accommodating the entire tension bar may be provided at a portion on an outer circumferential surface of the slider such that the connecting portion between the tension bar and the slider is arranged closer to the center of gravity than is the outer circumferential surface of the slider.

The measuring device according to the present invention has the above-noted translation movement device installed as a translation movement device of a stylus head and the stylus head is attached to a tip of the long slider. With this configuration, when a stylus head such as a measurement probe is attached to the tip of the long slider and reciprocates, occurrence of a difference in the position of the stylus head between forward and backward displacement can be suppressed. Further, a change in the position of the stylus head can be suppressed even when the environmental temperature changes. As a result, a satisfactory measurement value can be obtained even when the displacement direction is different or the environmental temperature changes.

With the configuration according to the present invention, in the translation movement device employing the belt drive, when the long slider is displaced in one direction or in the opposite direction with respect to the guide, a difference may arise in the displacement amount of the end portion of the long slider in the direction orthogonal to the displacement direction, and this difference is minimized. Also, even when the environmental temperature changes, as the difference in the coefficient of thermal expansion due to the difference in the coefficient of expansion of each material is not generated between the long slider and the open belt, a change in position of the end portion of the long slider in the direction orthogonal to the displacement direction is reduced. Furthermore, by installing the above-noted translation movement device in the measuring device as a stylus head displacer, the measurement accuracy of the measuring device can be improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
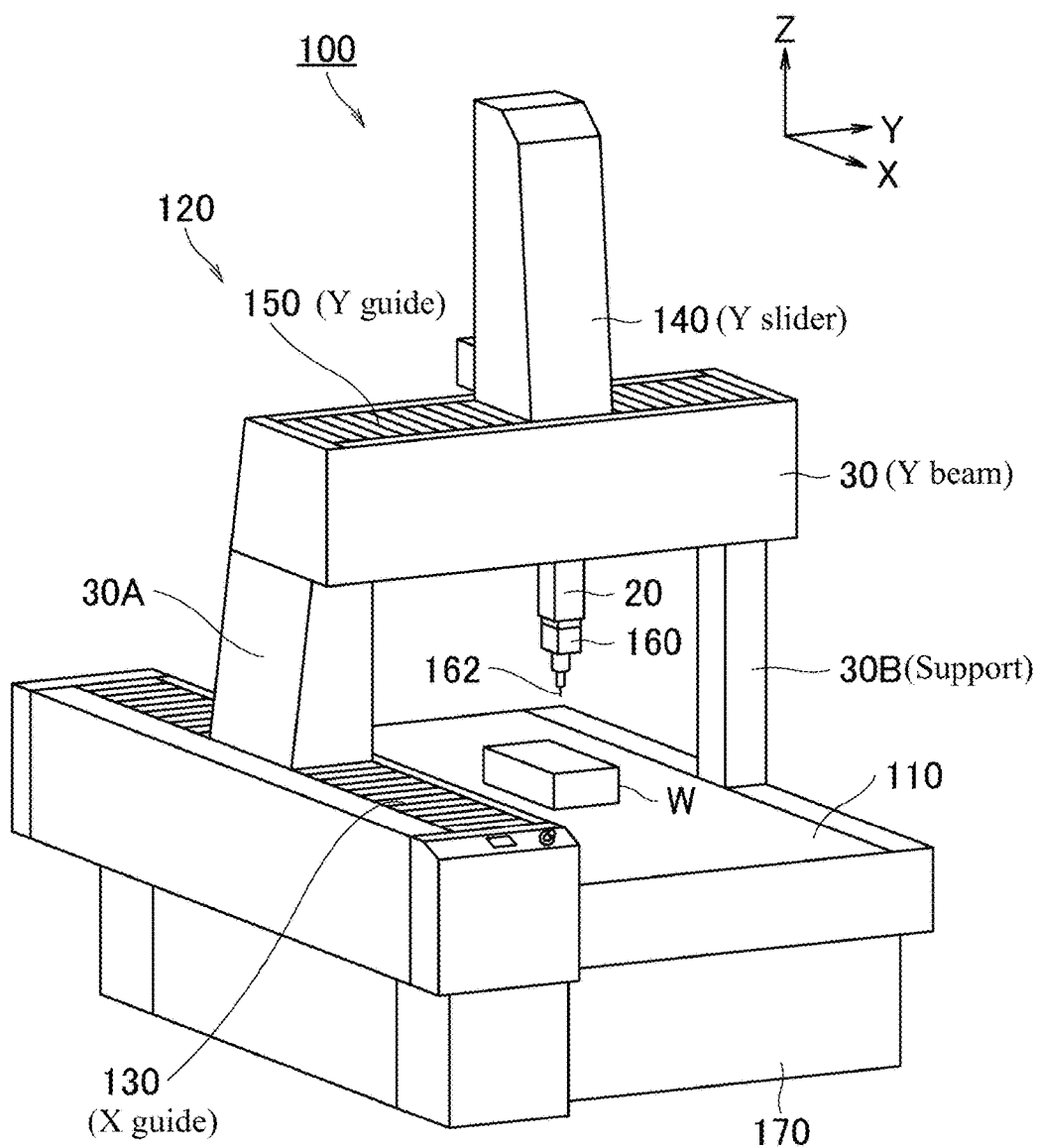
FIG. 1 is an overall external view of a three-dimensional coordinate measuring device according to an embodiment of the present invention.

Hereafter, with reference to the drawings, a translation movement device employing a belt drive according to the present invention and embodiments of a measuring device provided with the translation movement device are described. FIG. 1 is a perspective view illustrating an exemplary configuration of a three-dimensional coordinate measuring device 100. Here, an example is given of a three-dimensional coordinate measuring device having a bridge slider in an X-axis direction as the translation movement device. However, the present invention can also be applied to various other types of three-dimensional coordinate measuring devices, such as a gate-fixated type combined with a displacement table, a type having a large slider with a gate width exceeding two meters, and a type configured with a cantilever beam in a Y-axis direction installed on an X-axis slider.

As shown in FIG. 1, the measuring device 100 is configured with a base 110, a bridge slider 120 which is capable of displacement in the X-axis direction, an X guide 130 provided at a bottom portion of column 30A of the bridge slider 120, a Y slider 140 moving along a Y beam 30 which is a lateral beam of the bridge slider 120, a Y guide 150 guiding the Y slider 140 in a Y-axis direction, a spindle 20 provided so as to be freely elevated and lowered with respect to the Y slider 140, a measurement head 160 provided to a bottom end of the spindle 20, and an installation table 170.

An X-axis displacement apparatus is configured with the X guide 130 provided at one edge side on an upper surface of the base 110, and an X slider (not in the drawing) capable of being displaced in the X-axis direction by the X guide 130. In addition, a Y-axis displacement apparatus is configured with the Y guide 150 provided to the Y beam 30 of the bridge slider 120, and the Y slider 140. Furthermore, the Z-axis displacement apparatus is configured with a Z guide installed on the Y slider 140, and the spindle 20. The spindle 20 is a long member extending in a vertical direction and the measurement head 160 on the bottom end of the spindle 20 is provided with a stylus head corresponding to a measurement purpose (a contact-type measurement probe 162, for example).

The base 110 installed above the installation table 170 is a surface plate made of a stone material, cast iron, concrete, or the like and a measured object (work piece) W is placed on an upper surface of the base 110. The translation movement device according to the present invention can also be applied to a bridge displacement type that does not have the surface plate, called a gantry type.

The coordinate measuring device 100 configured this way detects each of the displacement positions of the X slider, the Y slider 140, and the spindle 20 respectively when a contact head provided to a tip of the measurement probe 162 contacts the measured object placed on the base 110, and can calculate position coordinates of the surface of the measured object and provide data of a surface shape of the measured object to a measurer.

First Embodiment

Figure 2:
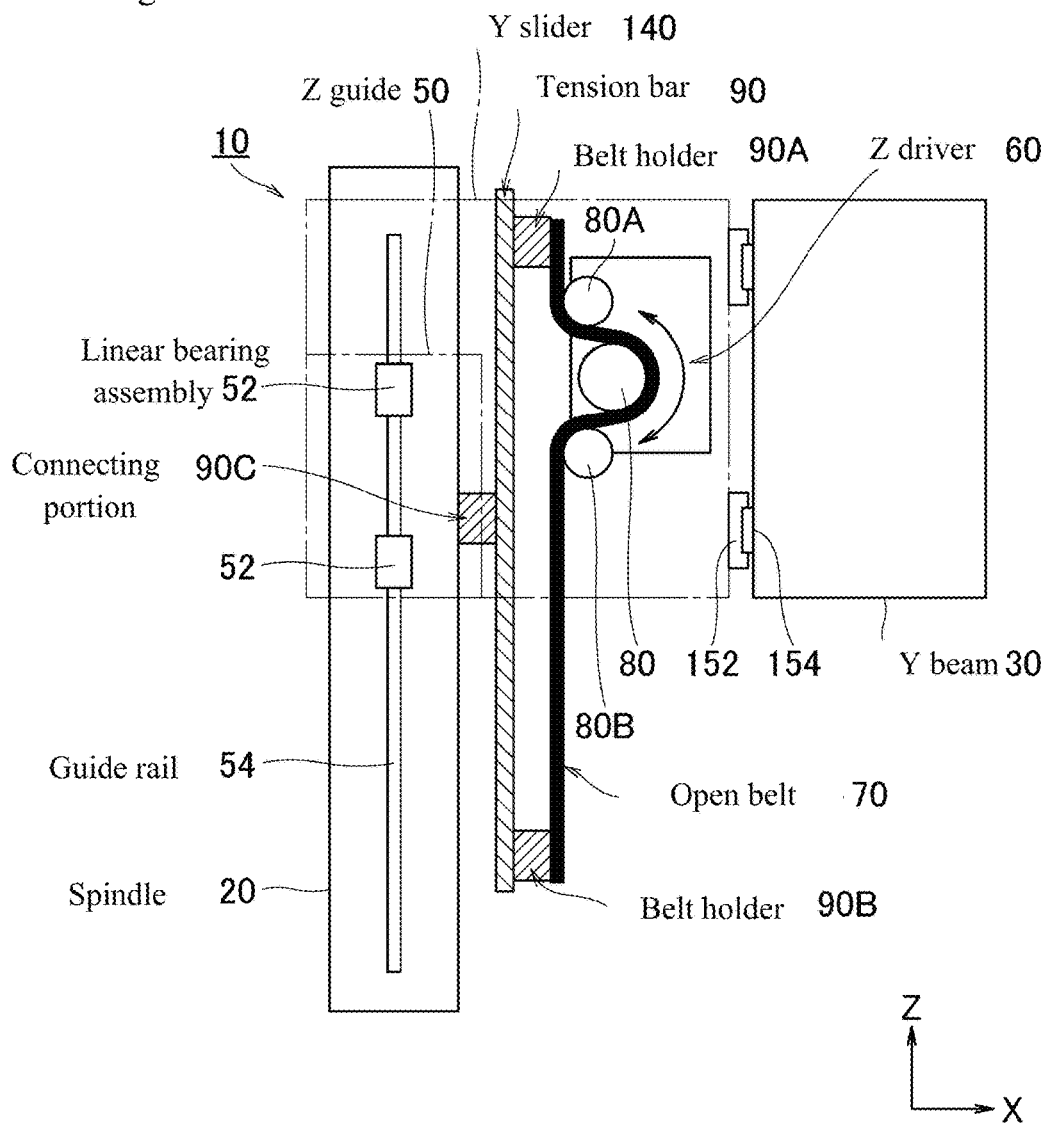
FIG. 2 is a schematic side view of a configuration of a Z-axis displacement apparatus according to a first embodiment.

Next, FIG. 2 illustrates a schematic view of a Z-axis displacement apparatus according to a first embodiment. A Z-axis displacement apparatus 10 is installed on the Y slider 140, which is guided and supported in the length direction of the Y beam 30 by the Y guide (linear bearing assembly 152 and guide rail 154). The Z-axis displacement apparatus 10 includes a Z guide 50 provided to the Y slider 140, the spindle 20 guided by the Z guide 50 in the vertical direction, and a Z driver 60 provided to the Y slider 140 and displacing the spindle 20. The Z-axis displacement apparatus 10 elevates and lowers the spindle 20.

The Z guide 50 is configured with the guide rail 54 and the linear bearing assemblies 52. The guide rail 54 is formed on the surface of the spindle 20 (on each of the positive Y-axis direction and negative Y-axis direction surfaces) along the Z-axis direction. The linear bearing assemblies 52 are linearly movable over each of the guide rails 54. By fixating each of the linear bearing assemblies 52 to the Y slider 140, the spindle 20 (on a displacement side) can be guided vertically with respect to the Y slider 140 (on a fixed side). As the Z guide 50, a case using a linear bearing mechanism achieved by mechanical contact is described, however, an air bearing mechanism may be used instead. When the air bearing mechanism is used, a plurality of air pads are arranged so as to hold the spindle 20 therebetween creating an air layer between the air pads and the surface of the spindle 20, which allows the spindle 20 to be guided without contact.

The Z driver 60 is a belt drive mechanism and is configured with an open belt 70, a driving pulley 80, a pair of auxiliary pulleys 80A and 80B, and a tension bar 90.

The tension bar 90, which is distinctive to the present invention, is provided substantially parallel to a displacement direction of the spindle 20, running at least from a position above the linear bearing assemblies 52 of the Z guide 50 to a position below the same. Then, the tension bar 90 and the spindle 20 are coupled to each other by a single connecting portion 90C provided to substantially a center of the tension bar 90 in a longitudinal direction. Further, the above-noted connecting portion 90C is preferably provided to the center of gravity height of the spindle 20 in the Z-axis direction. Furthermore, when the spindle 20 is in a lower limit position, the above-noted connecting portion 90C is preferably positioned within a Z-axis direction range of the guide mechanism (such as a linear bearing mechanism) of the Z guide 50.

The open belt 70 is arranged along the displacement direction of the spindle 20. A first end portion (open end) of the open belt 70 is held, at a position at least above the Z guide 50, by a belt holder 90A provided to the tension bar 90. A second end portion is held, at a position at least below the Z guide 50, by a belt holder 90B provided to the tension bar 90.

The driving pulley 80 is axis-supported by an axis receiver provided to the Y slider 40 and is rotation driven by a rotational drive force from a motor in both forward and backward directions. The pair of auxiliary pulleys 80A and 80B are axis-supported by respective axis receivers at positions slightly offset toward the tension bar side.

The open belt 70 is arranged substantially vertically downward from the upper belt holder 90A to the auxiliary pulley 80A, changes direction at the auxiliary pulley 80A, is wound around the driving pulley 80 with a predetermined winding angle, changes direction again at the second auxiliary pulley 80B, and is arranged substantially vertically downward from the auxiliary pulley 80B to the lower belt holder 90B. When assembling, in a state where the open belt 70 is pulled, both end portions of the open belt 70 are held by the belt holders 90A and 90B which provides a predetermined initial tension to the open belt 70. The initial tension is provided to prevent the open belt 70 from skipping teeth. In FIG. 2, there is a space between the tension bar 90 and the open belt 70. However, depending on selection of the belt holders 90A and 90B, the tension bar 90 and the open belt 70 can be arranged having no space therebetween, that is, one surface of the open belt 70 is in contact with the surface of the tension bar 90. In this case, when an uneven toothed surface which engages with an uneven toothed surface of the open belt (timing belt) 70 is formed on the surface of the tension bar 90, the integral displacement of the open belt 70 with the tension bar 90 is facilitated and positioning accuracy of the spindle 20 is improved.

In the Z-axis displacement apparatus 10 which is configured as noted above, a driving force of the driving pulley 80 is transmitted to the tension bar 90 via the open belt 70, and is further transmitted to the spindle 20 via the connecting portion 90C. Accordingly, the spindle 20 displaces vertically in response to a rotation direction of the driving pulley 80.

Figure 3:
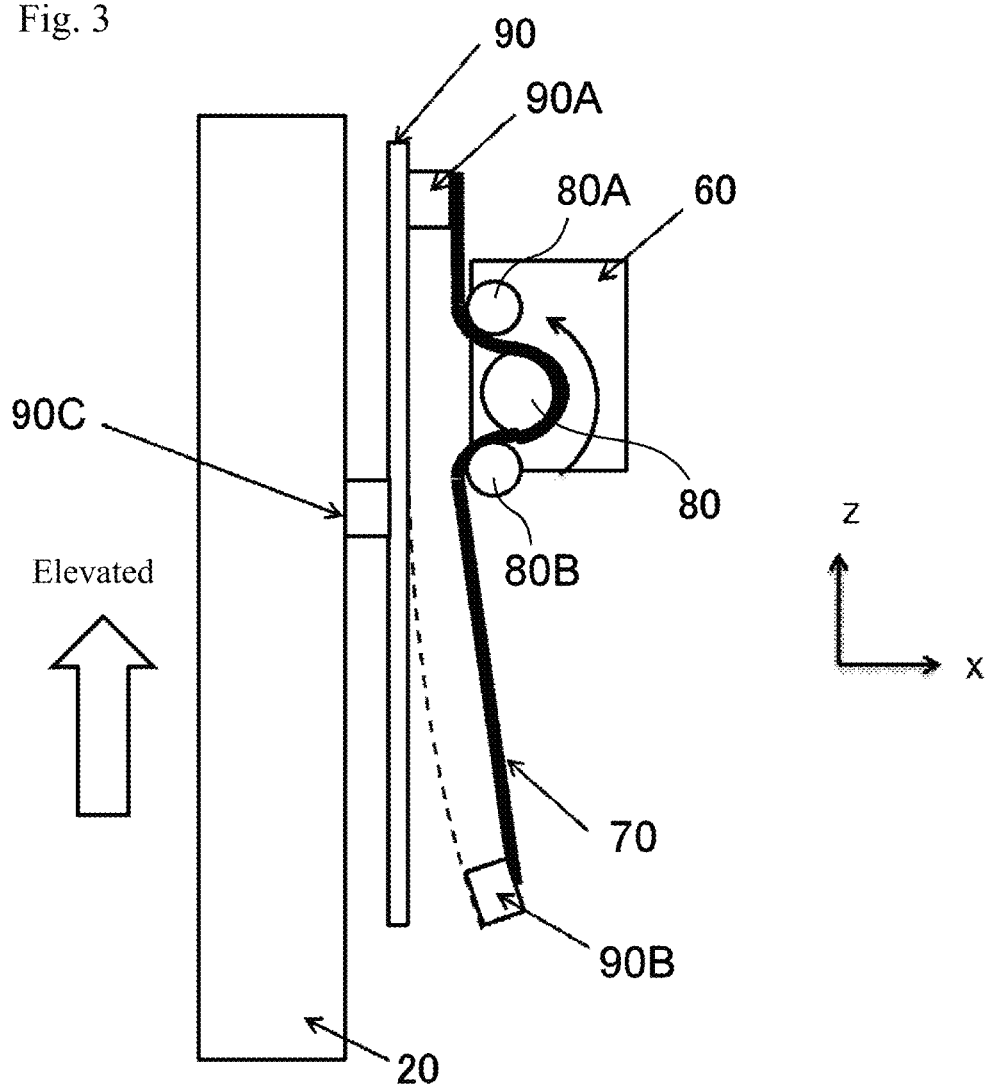
FIG. 3 is an explanatory diagram illustrating a principle that a spindle of the Z-axis displacement apparatus is not affected by belt tension.
Figure 11:
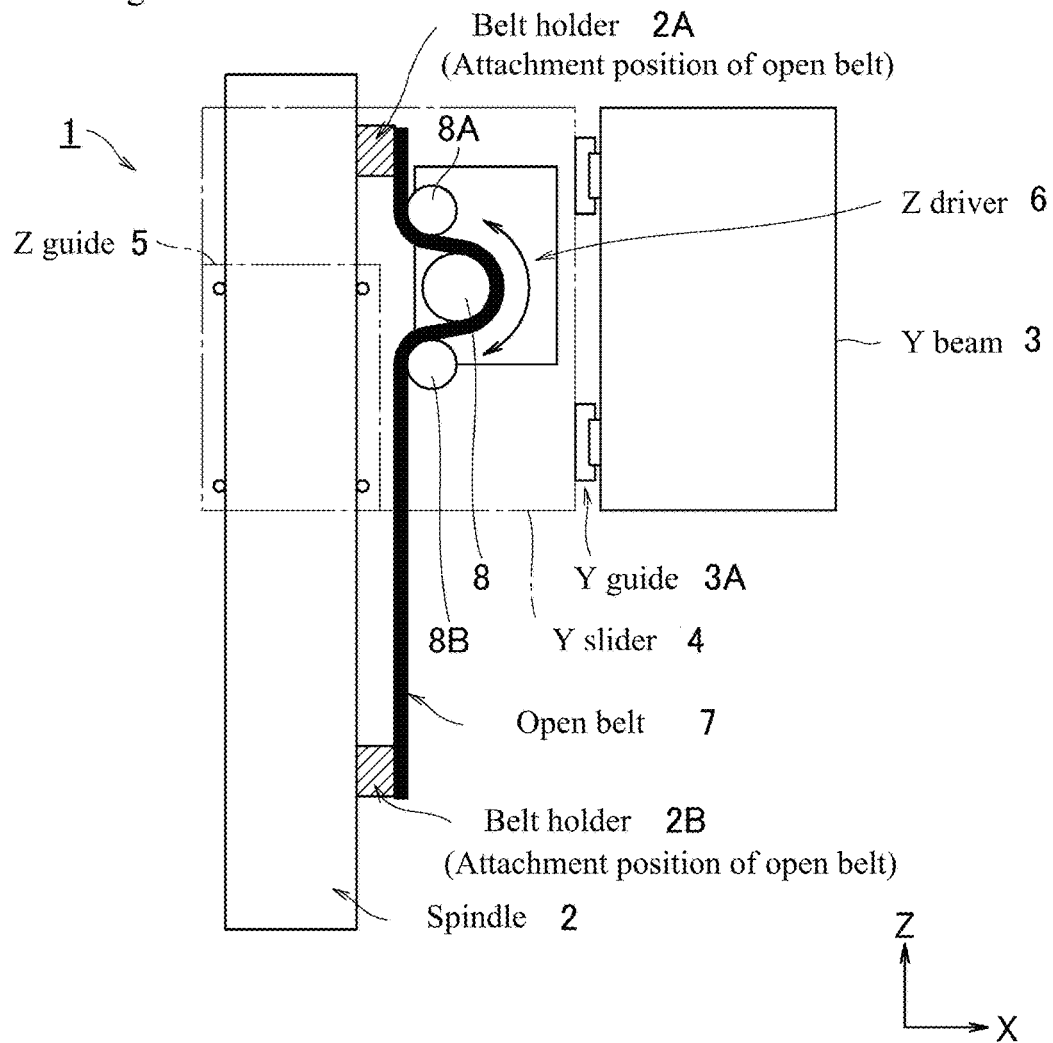
FIG. 11 is a schematic view when viewed from a side of a configuration of the conventional Z-axis displacement apparatus.
Figure 12:
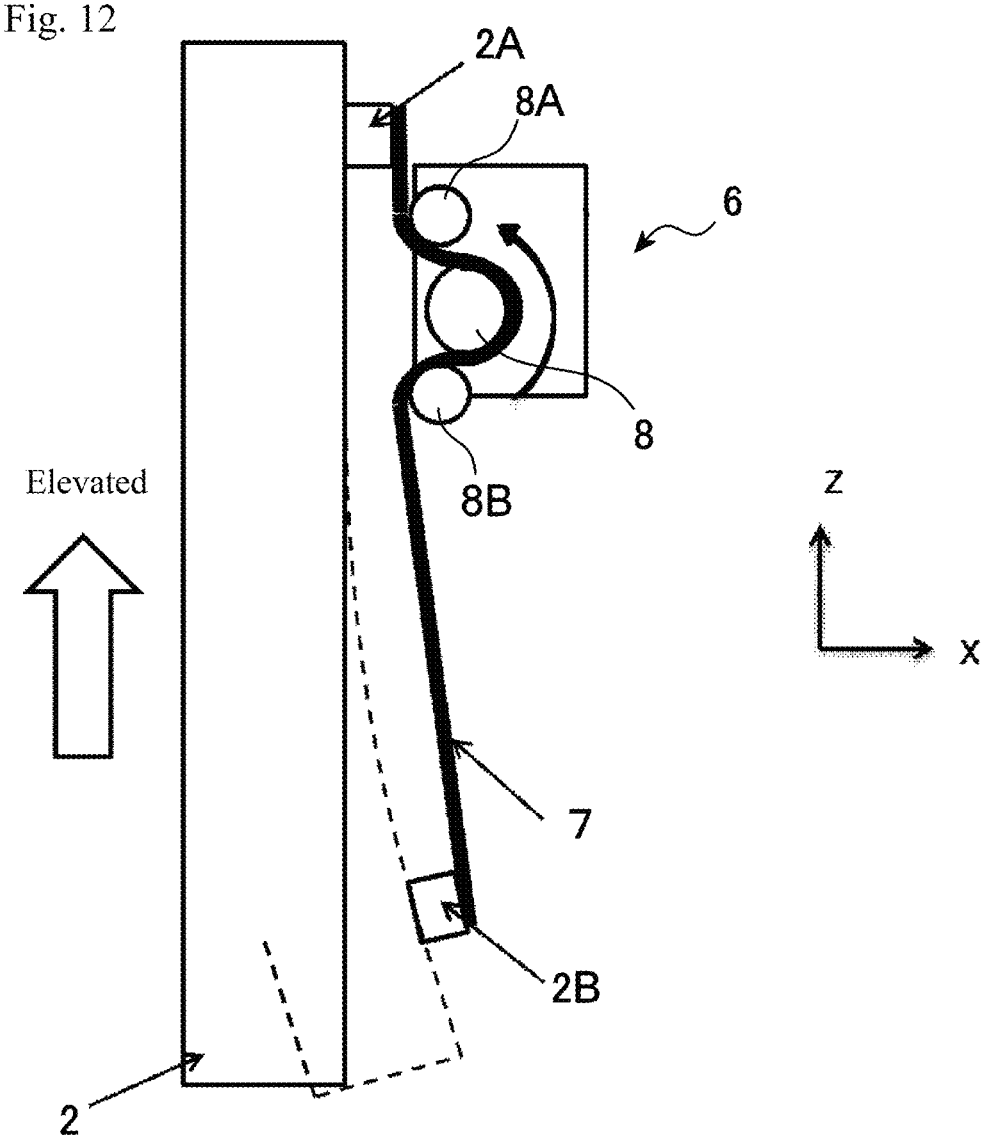
FIG. 12 is an explanatory diagram illustrating a bending influence applied to the spindle of the conventional Z-axis displacement apparatus during elevation.
Figure 13:
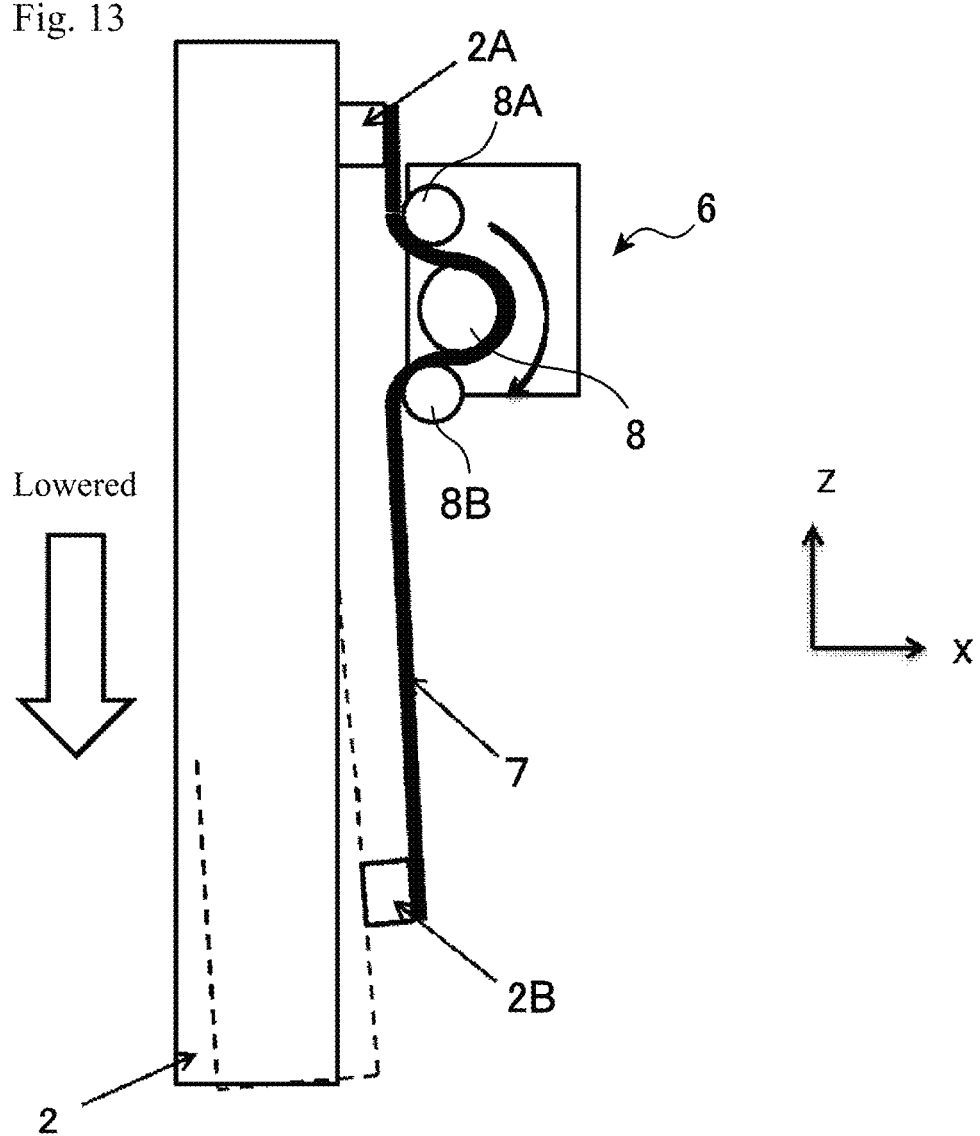
FIG. 13 is an explanatory diagram illustrating the bending influence applied to the spindle of the conventional Z-axis displacement apparatus during lowering.
Figure 14:
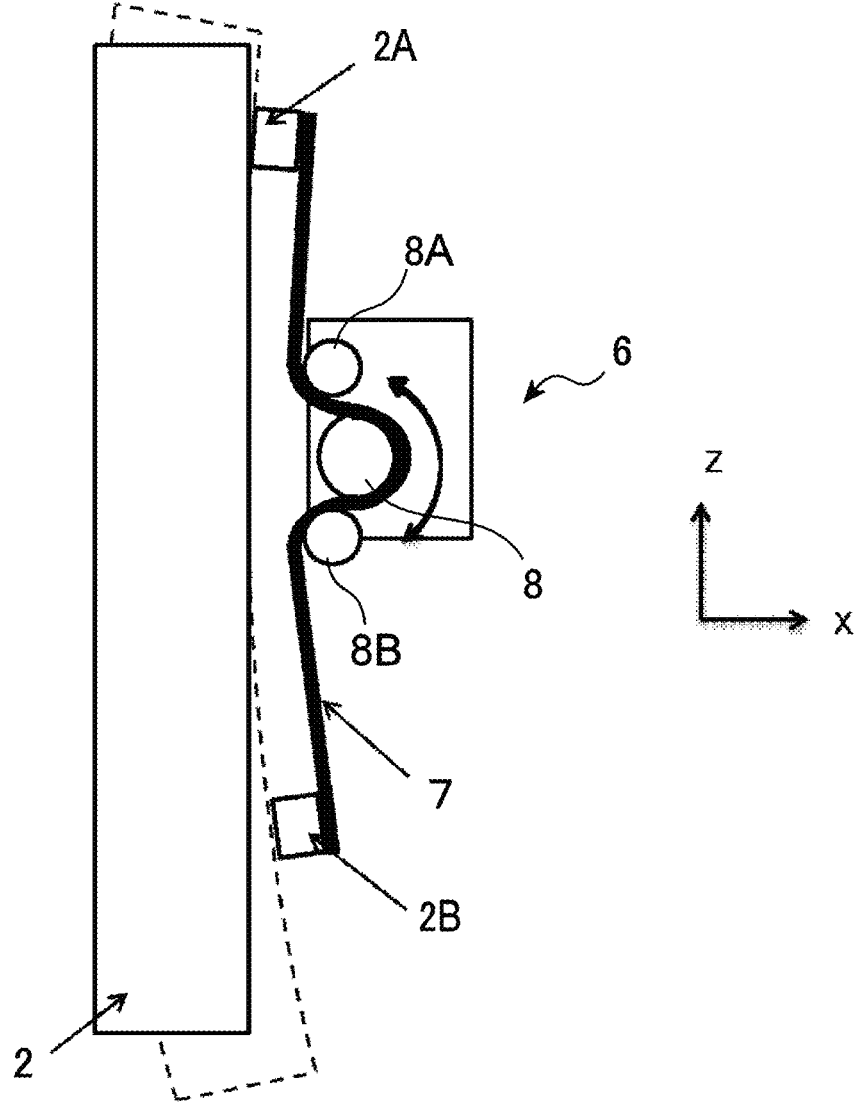
FIG. 14 is an explanatory diagram illustrating an influence applied to the spindle of the conventional Z-axis displacement apparatus when a temperature changes.

Similar to the conventional open belt in FIG. 11, the initial tension is applied to the open belt 70 when used. The tension bar 90 is deformed by receiving the tension. However, the tension bar 90 and the spindle 20 are coupled to each other only at one location (connecting portion 90C), and therefore, even when the tension bar 90 is deformed, the spindle 20 is hardly deformed. In addition, when the spindle 20 is elevated, as shown in FIG. 3, output torque of the driving pulley 80 is increased, and therefore, the force which the belt 90B receives is increased. On the other hand, when the spindle 20 is lowered, the output torque of the driving pulley 80 is decreased, and therefore, the force which the belt 90B receives is decreased. With this configuration, even when different degrees of tension are applied to the belt holder 90B when the spindle 20 is elevated and lowered, because the tension bar 90 and the spindle 20 are coupled to each other only by the connecting portion 90C, only a deformation amount of the tension bar 90 is different and there is hardly any influence on the spindle 20.

Figure 4:
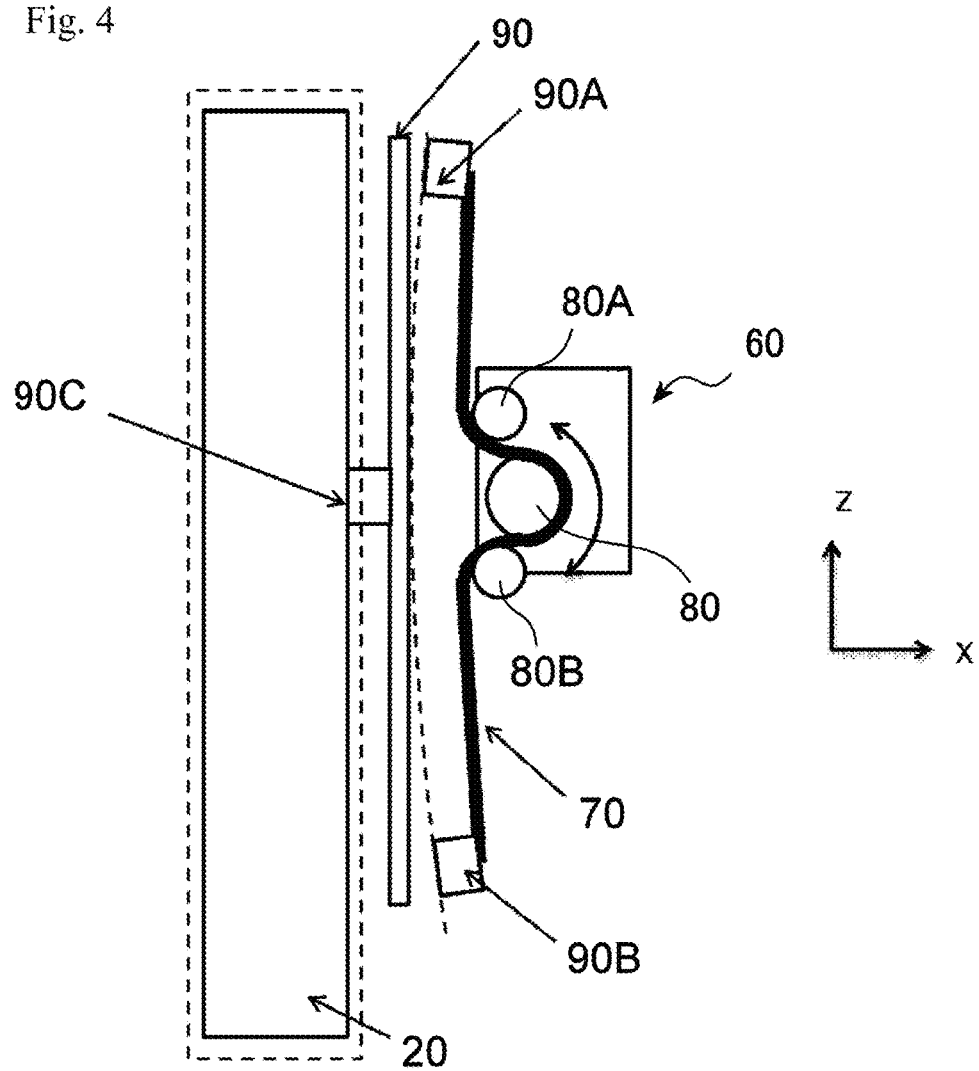
FIG. 4 is an explanatory diagram illustrating a principle that the spindle of the Z-axis displacement apparatus is not affected by a change in environmental temperature.

In addition, when an environmental temperature where the coordinate measuring device is arranged rises, the spindle 20, the open belt 70, and the tension bar 90 expand together. The tension bar 90 is made of metal and the open belt 70 is made of rubber containing glass fiber, as in the prior art. Therefore, similar to the conventional type in FIG. 11, an expansion amount of the open belt 70 is decreased with respect to the expansion amount of the tension bar 90. Accordingly, when the environmental temperature rises, the tension bar 90 is bent in the positive X-axis direction due to the difference in the coefficient of thermal expansion (FIG. 4). However, the tension bar 90 and the spindle 20 are coupled to each other only at one location (connecting portion 90C), and therefore, even when the tension bar 90 is deformed, the spindle 20 is hardly deformed.

Second Embodiment

Figure 5:
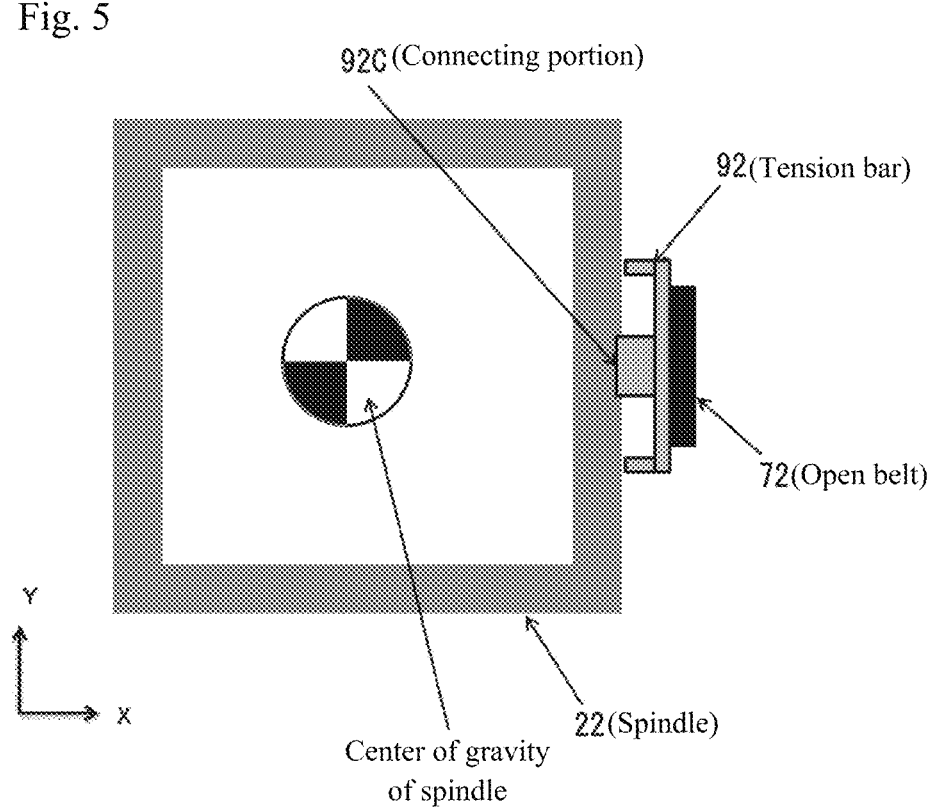
FIG. 5 is a schematic view illustrating a cross-section of a Z-axis displacement apparatus according to a second embodiment.

FIG. 5 is a cross-sectional view of a spindle 22 and a tension bar 92 at a section taken on an X-Y plane in a Z-axis displacement apparatus according to a second embodiment of the present invention. The tension bar 92 is a part supporting tension of an open belt 72, and requires enough rigidity not to buckle-deform due to the tension. In order to resolve this issues, the cross-sectional shape of the tension bar 92 is formed in a U-shape with an opening facing toward the spindle 22 as shown in FIG. 5, which allows the tension bar 92 to retain enough rigidity not to buckle-deform due to the tension from the open belt 72.

Third Embodiment

Figure 6:
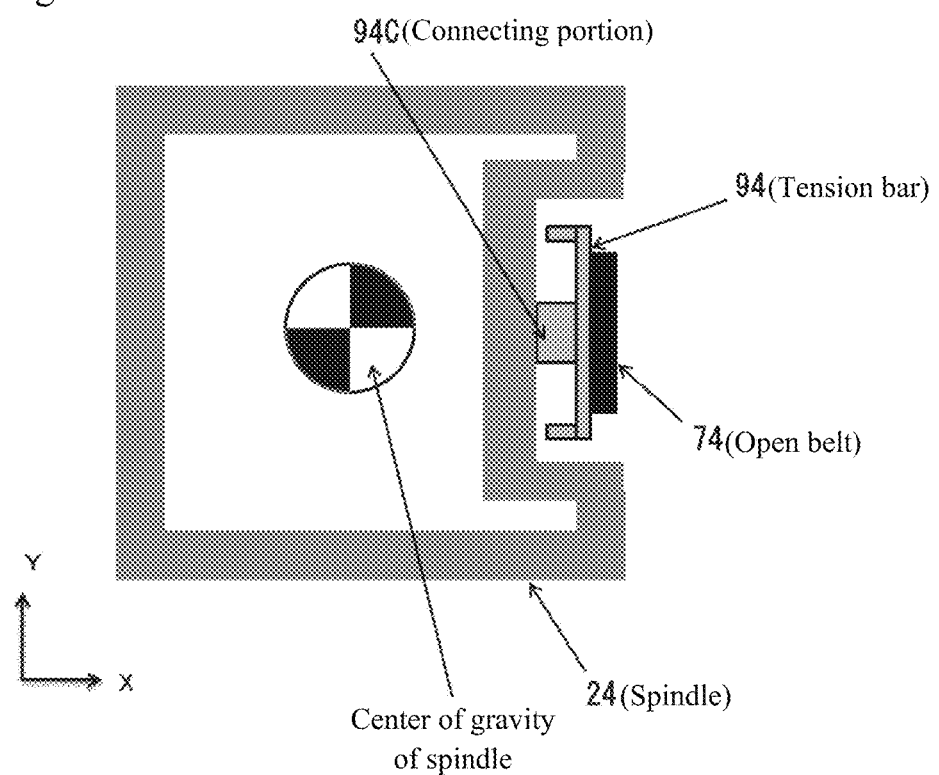
FIG. 6 is a schematic view illustrating a cross-section of a Z-axis displacement apparatus according to a third embodiment.

FIG. 6 is a cross-sectional view of a spindle 24 and a tension bar 94 at a section taken on the X-Y plane in a Z-axis displacement apparatus according to a third embodiment of the present invention. A driving point of the spindle 22 (the position where the driving force is applied to the spindle) is positioned away from the center of gravity position (center of the spindle) of the spindle 22. As a result, a moment around the X-axis or Y-axis is applied to the spindle 22 when the driving force is applied to the spindle 22, which may affect the measurement result by causing vibration, for example.

Figure 7:
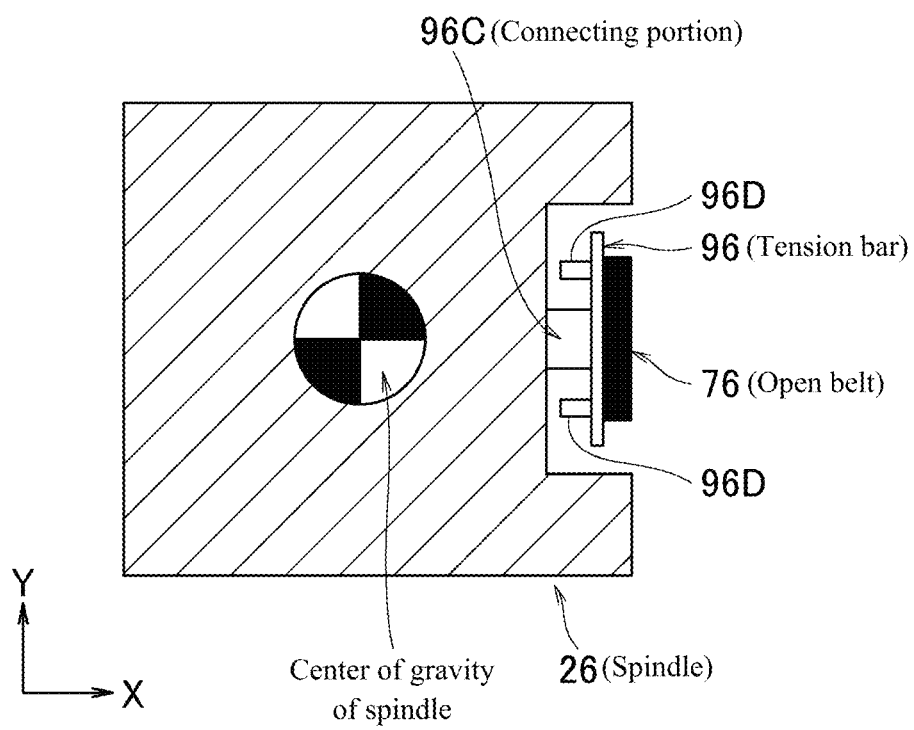
FIG. 7 is a schematic view illustrating a modified example of the cross-section of the Z-axis displacement apparatus according to the third embodiment.

In the present embodiment, in order to resolve the issues noted above, the cross-sectional shape of a portion of an outer surface of the spindle 24 is formed in a stepped shape as shown in FIG. 6. With this configuration, a connecting portion 94C of the tension bar 94 can be brought closer to the center of gravity of the spindle 24. As a result, when the driving force is applied to the spindle 24, the moment around the X-axis or Y-axis can be decreased. In this example, a modified example of the cross-sectional shape of the tension bar is shown in FIG. 7. Instead of providing a U-shaped tension bar, a similar effect can be obtained even when a fin-shaped member 96D extending in the Z direction is formed on the spindle side of the tension bar 96. In the Z-axis displacement apparatus in FIG. 7, the spindle 26 is not in a hollow shape, but rather is formed as a solid square column member, and an indentation large enough to accommodate the tension bar 96 is formed on the side surface thereof. As shown in FIGS. 5 to 7, the Z-axis displacement apparatus according to the present invention can be applied to both the hollow spindle and the solid spindle.

EXAMPLE

Figure 8A:
FIG. 8A is a graph illustrating measurement results of a measured object when a tension bar is not provided.
Figure 8B:
FIG. 8B is a graph illustrating the measurement results of the measured object when the tension bar is provided.
Figure 9:
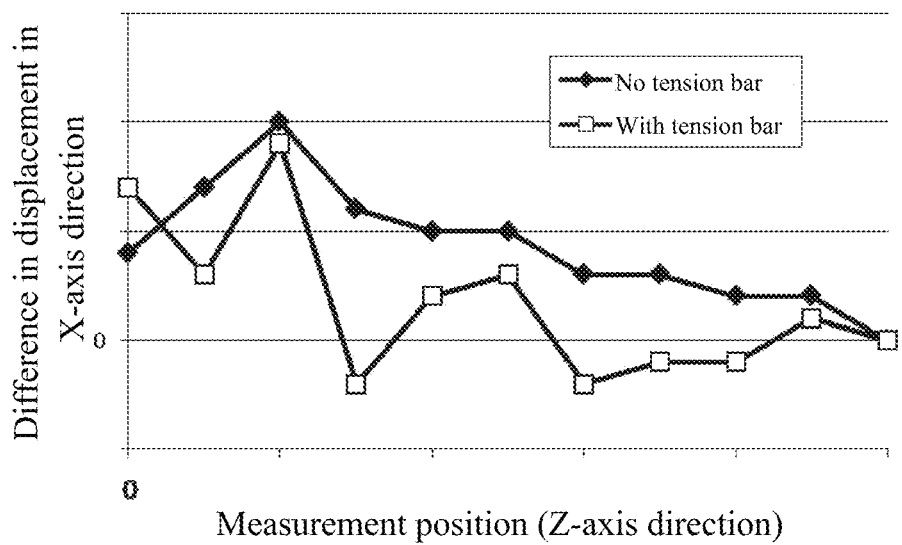
FIG. 9 is a graph illustrating the measurement results from FIGS. 8A and 8B when comparing differences in respective displacement amounts in an X-axis direction during elevating and lowering.

Hereafter, an example of the present invention is described with reference to FIGS. 8A, 8B, and 9. FIG. 8A shows the result of a Z-axis straightness measurement by the coordinate measuring device provided with the Z-axis displacement apparatus without the tension bar depicted in FIG. 11. FIG. 8B shows the result of the Z-axis straightness measurement by the coordinate measuring device provided with the Z-axis displacement apparatus having the tension bar depicted in FIG. 2.

The measured object of the Z-axis straightness measurement in FIGS. 8A and 8B is a straight ruler. During measurement, the straight ruler is arranged such that a measurement surface of the straight ruler is on a Y-Z plane of the coordinate measuring device. First, the measurement is performed while traveling up the measurement surface of the straight ruler from bottom to top. After measuring to the top end, the measurement is continued while traveling down the measurement surface from top to bottom. Various positions on the measurement surface where data is obtained are the same when the measurement surface is elevated and lowered.

In both FIGS. 8A and 8B, the measurement values deviate slightly for elevation and lowering. In order to clarify these differences, FIG. 9 shows results of calculating each of the differences between elevation and lowering. FIG. 9 shows that the difference in the respective measurement values when elevated and lowered is closer to zero when measured with the coordinate measuring device incorporating the Z-axis displacement apparatus having the tension bar than the Z-axis displacement apparatus without the tension bar.

When the coordinate measuring device of FIG. 11 having the Z-axis displacement apparatus without the tension bar is installed and the environmental temperature changes where the coordinate measuring device is arranged, an amount of thermal expansion is calculated. A space between the belt holders 2A and 2B at both end portions of the open belt 7 is 1,000 mm, the material of the spindle 2 is aluminum (coefficient of thermal expansion $23 \times 10^{-6}$ ($1/°$ C.)), and the material of the open belt 7 is rubber containing glass fiber (coefficient of thermal expansion $5 \times 10^{-6}$ ($1/°$ C.)).

In this example, the amount of thermal expansion of the spindle 2 and the open belt 7 is calculated individually (before assembly). When the environmental temperature changes by 10° C., the amount of thermal expansion of the spindle 2 alone is $$1000 \text{ (mm)} \times 23 \times 10^{-6} (1/° \text{ C.}) \times 10° \text{ C.} = 0.23 \text{ mm},$$

and the amount of thermal expansion of the open belt 7 alone is $$1000 \text{ (mm)} \times 5 \times 10^{-6} (1/° \text{ C.}) \times 10° \text{ C.} = 0.05 \text{ mm}.$$

The difference in the amount of thermal expansion between the spindle 2 alone and the open belt 7 alone is 0.18 mm.

Accordingly, when the spindle 2 is assembled with the open belt 7 and the environmental temperature changes by 10° C., the amount of thermal expansion of the open belt 7 is smaller than the spindle 2, and therefore, the spindle 2 is deformed so as to warp in the positive X-axis direction.

On the other hand, in the coordinate measuring device provided with the Z-axis displacement apparatus having the tension bar according to the first embodiment, shown in FIG. 2, when the material of the tension bar 90 is iron (expansion coefficient $12 \times 10^{-6}$ ($1/°$ C.)), the amount of deformation of the tension bar 90 alone is $$1000 \text{ (mm)} \times 12 \times 10^{-6} (1/° \text{ C.}) \times 10° \text{ C.} = 0.12 \text{ mm}.$$

The difference in the amount of thermal expansion between the tension bar 90 alone and the open belt 70 alone is 0.07 mm.

Therefore, when the tension bar 90 is assembled with the open belt 70 and the environmental temperature changes by 10° C., the amount of thermal expansion of the open belt 70 is smaller than the tension bar 90, and therefore, the tension bar 90 is deformed so as to warp in the positive X-axis direction. However, in the coordinate measuring device incorporating the Z-axis displacement apparatus according to the present embodiment, the tension bar 90 and the spindle 20 are coupled to each other at one location (the connecting portion 90C), and therefore, even when the tension bar 90 is deformed, the spindle 20 is not deformed.

Modifications

The translation movement devices according to the first to the third embodiments are apparatuses having the displacement direction in the vertical (Z-axis) direction. However, the translation movement device according to the present invention can also be applied to an apparatus in which the displacement direction is in a direction other than the Z-axis.

Figure 10:
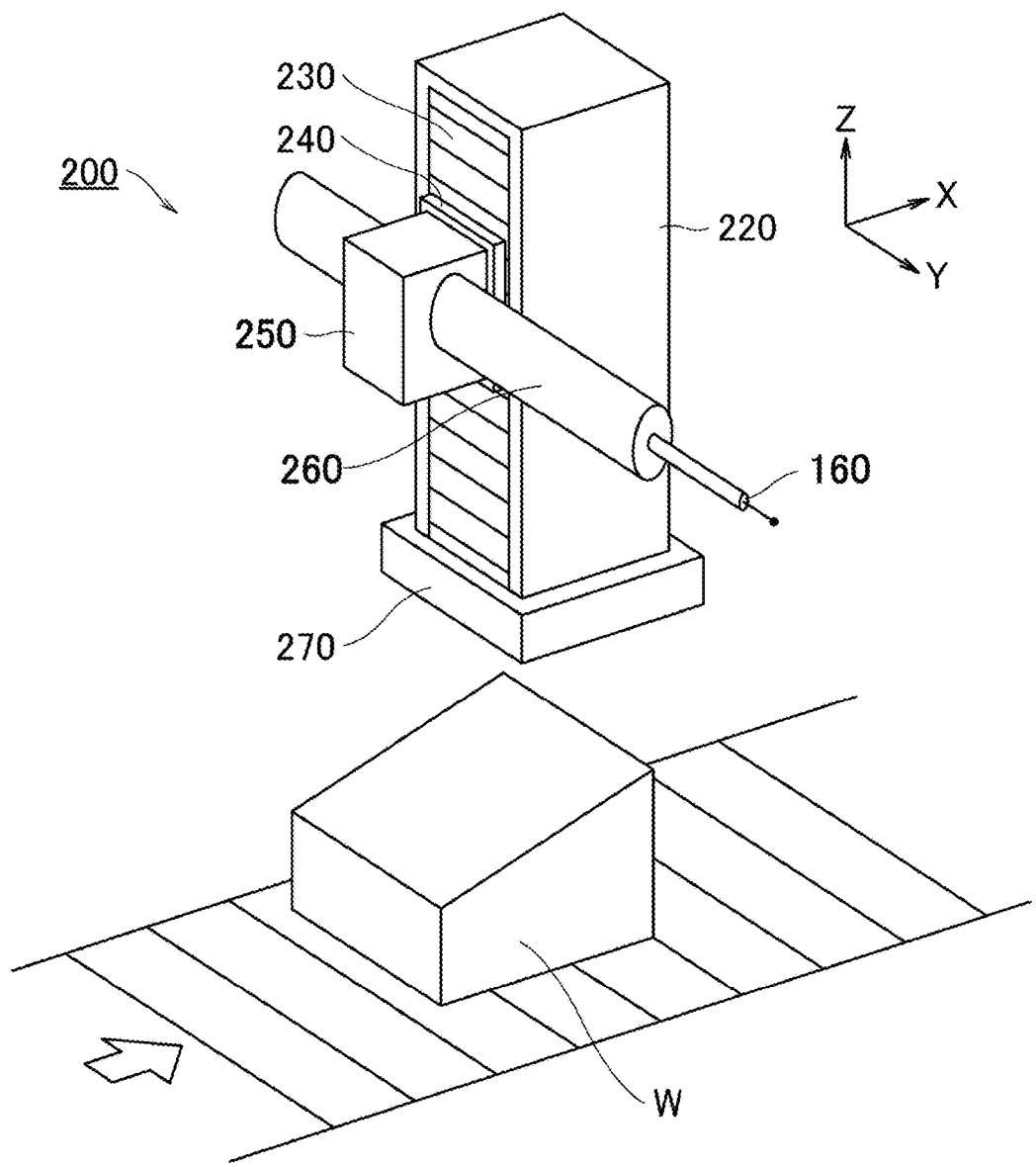
FIG. 10 illustrates a perspective view of a schematic configuration of a three-dimensional coordinate measuring device according to a modification.

FIG. 10 shows a three-dimensional coordinate measuring device for measuring a surface shape of a measured object W which is transported by a conveyor and the like. A coordinate measuring device 200 includes a column 220 standing on an installation table 270, a Z-axis displacement apparatus (Z guide 230 and Z slider 240) arranged thereon, and a Y-axis displacement apparatus (Y guide 250 and Y slider 260) installed on the Z slider 240. The Z slider 240 may include a rotation device that oscillates the Y guide 250 around the X-axis. By employing a configuration of the translation movement device employing the open belt according to the present invention in the above-noted Y-axis displacement apparatus (Y guide 250 and Y slider 260), the position of the measurement head 160 at the tip of the Y slider 260 can be displaced within the Y-Z plane.

Further, the translation movement device according to the present disclosure is configured such that multi-step spindles (long sliders) expand/contract together, which is suitable for a displacement apparatus that displaces the measurement head at the tip to a great distance by extending the spindles.

In the various embodiments, a description of the specific configuration of the belt holders 90A and 90B is omitted, however, the belt holders 90A and 90B may be held in a state where the open end of the open belt is fixated to a cylinder member and the belt is wound multiple times around the cylinder member. By configuring the cylinder member so as to allow an amount of rotation around the axis thereof to be adjusted, the tension of the belt can be appropriately adjusted.

The translation movement device employing the belt drive according to the present invention can be widely used as an apparatus displacing the long slider linearly using the guide. Specifically, the present invention can be utilized favorably as a translation movement device installed on measuring devices such as a coordinate measuring device, image measuring device, and shape measuring device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A translation movement device comprising:
    a guide having a guide assembly;
    a long slider which is guidable by the guide, wherein the long slider is longer in a displacement direction than the guide assembly; and
    a belt driver that displaces the long slider with respect to the guide, the belt driver comprising:
        an open belt arranged along the displacement direction of the long slider;
        a drive pulley that transmits a driving force to the open belt; and
        a tension bar arranged along the displacement direction of the long slider, wherein the tension bar includes belt holders that hold respective ends of the open belt, and wherein the tension bar is connected to the long slider at a middle position between the belt holders holding the respective ends.

2. The translation movement device according to claim 1, wherein the displacement direction of the long slider is in an elevating/lowering direction.

3. The translation movement device according to claim 2, wherein in a cross section on a plane orthogonal to the displacement direction, the tension bar has rigidity sufficient enough to prevent buckling deformation in response to tension received from the open belt.

4. The translation movement device according to claim 3, further comprising a connector that connects the tension bar and the long slider, wherein the connector is arranged proximate a center of gravity of the long slider on a plane orthogonal to the displacement direction.

5. The translation movement device according to claim 4, wherein the connector portion is arranged closer to the center of gravity than an outer circumferential surface of the long slider.

6. The translation movement device according to claim 2, further comprising a connector that connects the tension bar and the long slider, wherein the connector is arranged proximate a center of gravity of the long slider on a plane orthogonal to the displacement direction.

7. The translation movement device according to claim 6, wherein the connector portion is arranged closer to the center of gravity than an outer circumferential surface of the long slider.

8. The translation movement device according to claim 1, wherein in a cross section on a plane orthogonal to the displacement direction, the tension bar has rigidity sufficient enough to prevent buckling deformation in response to tension received from the open belt.

9. The translation movement device according to claim 8, further comprising a connector that connects the tension bar and the long slider, wherein the connector is arranged proximate a center of gravity of the long slider on a plane orthogonal to the displacement direction.

10. The translation movement device according to claim 9, wherein the connector portion is arranged closer to the center of gravity than an outer circumferential surface of the long slider.

11. The translation movement device according to claim 1, further comprising a connector that connects the tension bar and the long slider, wherein the connector is arranged proximate a center of gravity of the long slider on a plane orthogonal to the displacement direction.

12. The translation movement device according to claim 11, wherein the connector portion is arranged closer to the center of gravity than an outer circumferential surface of the long slider.

13. A measuring device comprising:
    a translation movement device comprising:
        a guide having a guide assembly;
        a long slider which is guidable by the guide, wherein the long slider is longer in a displacement direction than the guide assembly;
        a belt driver that displaces the long slider with respect to the guide, the belt driver comprising:
            an open belt arranged along the displacement direction of the long slider;
            a drive pulley that transmits a driving force to the open belt; and
            a tension bar arranged along the displacement direction of the long slider, wherein the tension bar includes belt holders that hold respective ends of the open belt, and wherein the tension bar is connected to the long slider at a middle position between the belt holders holding the respective ends; and
    a stylus head attached to a tip of the long slider.

14. The translation movement device according to claim 13, wherein the displacement direction of the long slider is in an elevating/lowering direction.

15. The translation movement device to claim 13, wherein in a cross section on a plane orthogonal to the displacement direction, the tension bar has rigidity sufficient enough to prevent buckling deformation in response to tension received from the open belt.

16. The translation movement device according to claim 13, further comprising a connector that connects the tension bar and the long slider, wherein the connector is arranged proximate a center of gravity of the long slider on a plane orthogonal to the displacement direction.

17. The translation movement device according to claim 16, wherein the connector portion is arranged closer to the center of gravity than an outer circumferential surface of the long slider.

* * * * *